Dec. 26, 1933.       R. CALLAGHAN       1,940,994
SAFETY ZONE GUARD
Filed Dec. 21, 1931
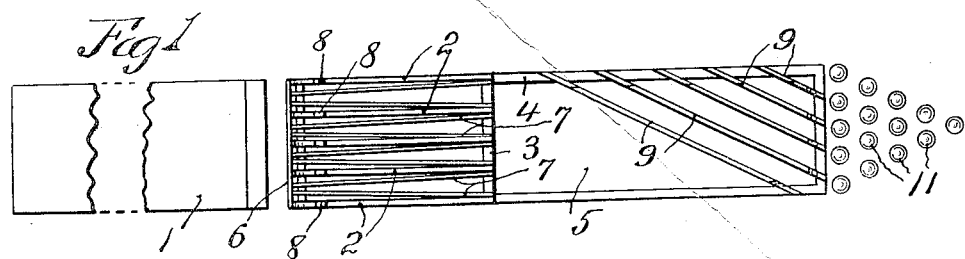
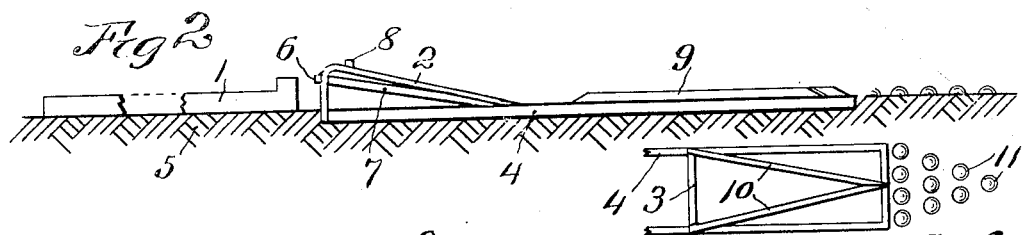
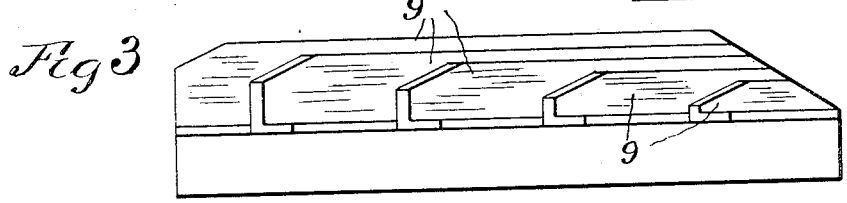
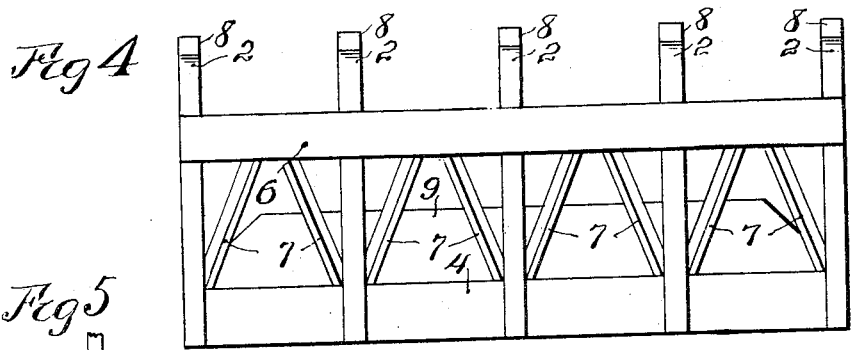
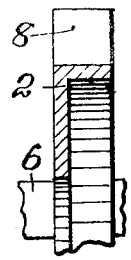
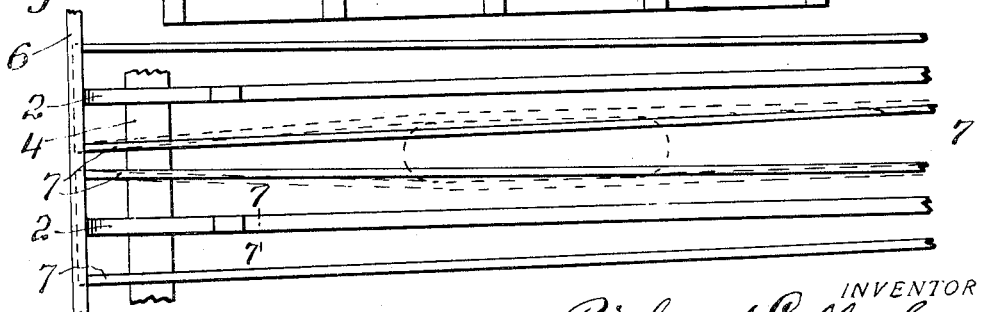
INVENTOR
Richard Callaghan
BY Warren D. House
His ATTORNEY
Witness
H. Vernon Olson Patented Dec. 26, 1933

1,940,994

UNITED STATES PATENT OFFICE 1,940,994

SAFETY ZONE GUARD

Richard Callaghan, Kansas City, Mo.

Application December 21, 1931
Serial No. 582,365

10 Claims. (Cl. 256—1)

My invention relates to improvements in safety zone guards.

One of the objects of my invention is to provide a novel zone guard which affords protection to the occupants of a safety zone, while it arrests or diverts from the zone a transgressing automobile with a minimum of injury to the machine or its occupants.

A further object is to provide a novel guard of the kind described, which is simple, relatively cheap, strong, durable, not likely to get out of order or to be very much damaged by an automobile which it arrests or diverts. Applicant on December 14, 1931 filed an application No. 582,364, for an improvement in Safety zone guards disclosing subject matter herein shown but not claimed herein.

The novel features of my invention are hereinafter fully described and claimed.

In the accompanying drawing illustrative of my invention,

Fig. 1 is a plan view of my improved guard shown adjacent to the front end of a safety zone, part of which is broken away.

Fig. 2 is a side elevation of the same.

Fig. 3 is a front end elevation, distant parts omitted, of the base frame and the diagonally disposed bars thereon.

Fig. 4 is a rear end elevation of the bulwark.

Fig. 5 is a plan view, enlarged, of the rear portion of the bulwark.

Fig. 6 is a plan view of a modification of the automobile diverting means.

Fig. 7 is an enlarged section on the line 7—7 of Fig. 5.

Similar characters of reference designate similar parts in the different views.

1 designates the raised platform of a safety zone forward of which and spaced therefrom is a bulwark which inclines upwardly and rearwardly and is adapted to support the axles of an automobile and which is provided with longitudinal passages adapted to receive at their front ends the wheels of the automobile.

The bulwark, in the form shown, comprises longitudinal upwardly and rearwardly inclined parallel bars 2, which may be angle bars, adapted to slidingly support the axles of a transgressing automobile, and spaced to form between them passages adapted to receive the wheels of the automobile.

The forward ends of the bars 2 are fastened to a cross bar 3 of a rectangular frame 4 set in the pavement 5 with its upper side flush with the surface of the pavement. The rear end portions of the bars 2 extend downwardly and are fastened at their lower ends to the adjacent end of the frame 4. A cross bar 6 is fastened to the rear vertical portions of the bars 2 to hold them from relative lateral movement.

Between each pair of bars 2 are upwardly and rearwardly inclined bars 7, preferably of resilient material, as spring steel, which bars 7 converge rearwardly and are so spaced as to receive between them at their front ends the wheels of an automobile, and to engage and pinch between them the sides of the wheels, as is shown in dotted lines in Fig. 5, thus serving to arrest the forward movement of the wheels. As shown in Fig. 1, some of the bars 7 diverge rearwardly from some of the other bars 2 and 7, so that the outer sides of a pair of such diverging bars may engage the inner sides of the front wheels and tend to arrest their forward movement.

The front ends of the bars 7 are fastened to the bars 2 over the cross bar 3. The rear ends of the bars 7 are fastened to the cross bar 6. The bars 7 serve as side walls for the passages receiving the automobile wheels.

Fastened to the upper sides of the bars 2 near their rear ends are upwardly extending blocks 8 which serve as means for engaging the front axle of the automobile to stop its rearward movement.

Means are provided for diverting the wheels of the automobile in advance of the bulwark which has just been described. Such means, as shown in Figs. 1 and 3, comprises rearwardly and laterally extending angle bars 9 fastened diagonally upon the base frame 4.

The bars 9 are, preferably spaced so as to admit between them the automobile wheels, and each bar, excepting the front one, has its upper edge higher than the bar next in front, so that if one of the front bars does not deflect laterally the automobile wheels, they may be engaged and deflected by some of the bars 9 at the rear of said front bar.

A modified form of deflecting means is shown in Fig. 6, in which are shown two bars 10, the front ends of which are fastened together and to the front end of the base frame 4, and the rear ends being fastened to the upper sides respectively of opposite sides of the frame 4 so as to diverge rearwardly. The spaces enclosed by frame 4 is filled to the top of the frame by the paving material 5.

Forward of the base frame 4 may be fastened to the pavement 5 usual traffic buttons 11 arranged in rows forming a triangle, Figs. 1 and 6. the apex of which is at the front. These traffic buttons may be some of them illuminated in the usual manner, and they form signalling means to a driver running upon them, to notify him that he is encroaching upon a safety zone, such signalling being by observing the lighted buttons, or by the jarring of the wheels. The buttons, as shown in Fig. 1 are disposed in their rear row so as to be respectively at the forward ends of the diagonal bars 9, so that wheels passing between the buttons of the rear row will be guided between the bars 9, so as to be diverted laterally thereby.

A car approaching from the front in alinement with the safety zone 1 will strike the buttons 11, thus signalling the driver of the car. If he does not laterally guide the car the wheels thereof will run between the bars 9 and will be laterally diverted thereby, or, if passing over the bars 9, the wheels will pass between two pairs of the rearwardly converging bars 7, and the axles will ride upwardly on the inclined bars 2.

The bars 7 will pinch the wheels engaged by them, which, with the upward inclination of the bars 2 will tend to stop the car. If the car is not stopped before the front axle strikes the blocks 8, the latter will, in most cases bring the car to a full stop. If the momentum of the car is sufficient to carry it past the blocks 8, due to the high rate of speed at which the car may have been travelling, the wheels will strike the cross bar 6, and in case that this bar does not stop the car, the wheels will strike the front end of the safety zone platform 1 and will finally bring the car to a stop before it can pass onto the platform. By having the bars 2 inclining upwardly from their front ends at one angle only of inclination to the blocks 8, as shown, the friction of the bars against the axles of the car will be applied evenly and gradually thereto, thereby tending to bring the car to a standstill with a minimum of shock to the car and its occupants.

In most instances, the arresting means described and shown will stop an encroaching car with little injury to the car and none to the occupants thereof, as well as protecting the occupants of the safety zone from injury by the car.

Other modifications of my invention, within the scope of the appended claims, may be made without departing from the spirit of my invention.

What I claim is:—

1. In a safety zone guard, a bulwark adapted to be placed at one end of a safety zone and inclining upwardly and rearwardly toward the zone and adapted to slidingly support the axles of an automobile and provided with longitudinal passages adapted to receive therein at their front ends the wheels of the automobile, said passages having rearwardly converging side walls adapted to engage the sides of said wheels and arrest the rearward movement thereof.

2. In a safety zone guard, an upwardly and rearwardly inclined bulwark adapted to slidingly support the axles of an automobile, and provided near its rear end with abutment means adapted to engage and stop the forward movement of the front axle of the automobile, and provided with longitudinal passages adapted to receive at their front ends the wheels of the automobile, said passages having rearwardly converging walls adapted to engage the sides of said wheels and arrest the forward movement thereof.

3. In a safety zone guard, a bulwark adapted to be placed at one end of a safety zone and having longitudinal passages adapted to receive at their front ends the wheels of an automobile and having rearwardly converging side walls adapted to engage the sides of said wheels and arrest their forward movement.

4. In a safety zone guard, a bulwark adapted to be placed at one end of a safety zone and having longitudinal passages adapted to receive at their front ends the wheels of an automobile and having rearwardly converging resilient side walls adapted to engage and exert a spring pressure against the sides of said wheels so as to resist their forward movement.

5. In a safety zone guard, an upwardly and rearwardly inclined bulwark adapted to be placed at one end of a safety zone and to slidingly support the axles of an automobile and provided with longitudinal passages adapted to receive at their forward ends the wheels of said automobile, said passages having therein resilient means adapted to exert a pressure against the sides of said wheels so as to resist their forward movement.

6. In a safety zone guard, a bulwark adapted to be placed at one end of a safety zone and to slidingly support the axles of an automobile and inclining upwardly and rearwardly and provided with longitudinal passages, and in each of said passages having two inclined rearwardly converging bars adapted to receive between them one front wheel of the automobile and to engage the sides of said wheel so as to arrest its forward movement.

7. In a safety zone guard, upwardly and rearwardly inclined bars adapted to be placed at one end of a safety zone and to slidingly support the axles of an automobile and spaced to form longitudinal passages adapted to receive between them at their front ends the wheels of the automobile, and longitudinal bars disposed in pairs the bars of each pair converging rearwardly in said passages and adapted each pair to engage the sides of one of said wheels so as to arrest its forward movement.

8. In a safety zone guard, upwardly and rearwardly inclined longitudinal bars adapted to be placed at one end of a safety zone and to slidingly support the axles of an automobile and spaced to form passages between them adapted to receive at their front ends the wheels of the automobile, two of said bars diverging rearwardly from each other and being so spaced as to adapt them to so engage the sides of said wheels as to arrest their forward movement.

9. In a safety zone guard, longitudinal upwardly and rearwardly inclined bars spaced to form longitudinal passages adapted to receive the wheels of an automobile, said bars being adapted to slidingly support the axles of the automobile, and means connecting said bars adjacent to their rear ends for holding their upper portions from relative lateral movement.

10. In a safety zone guard, the combination with a safety zone, of longitudinal upwardly and rearwardly inclined bars spaced to form between them passages adapted to receive the wheels of an automobile, and adapted to slidingly support the axles of the automobile, said bars extending from their front ends at one angle of inclination only to substantially their uppermost parts.

RICHARD CALLAGHAN.